Feb. 4, 1958  J. J. REGAN  2,822,107
MILK STRAINER COVER
Filed Aug. 23, 1954
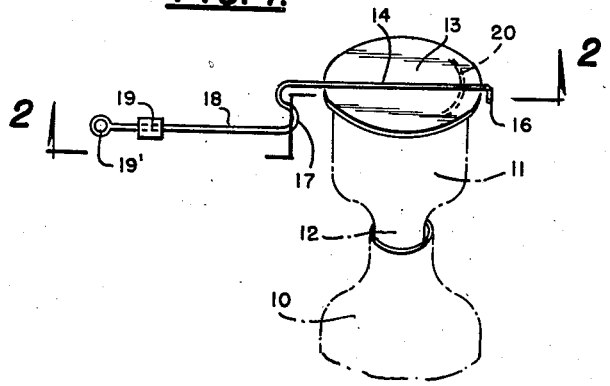
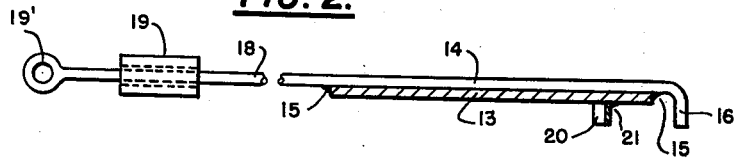
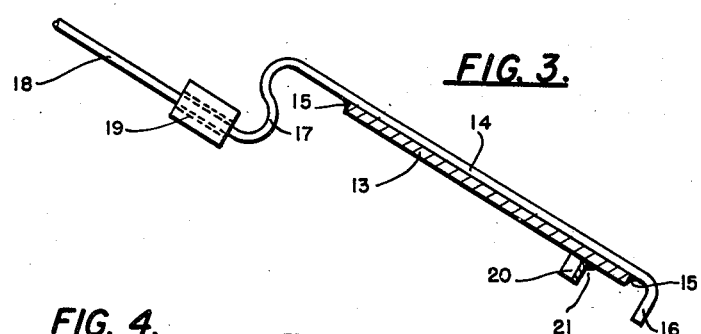
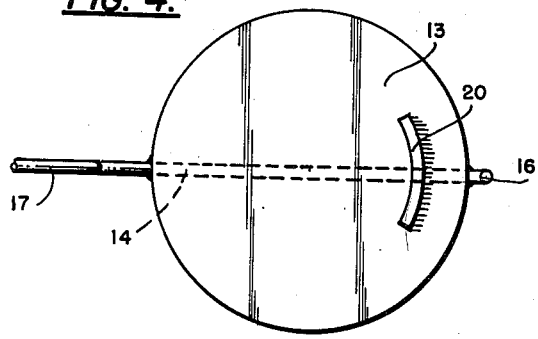
INVENTOR
JOHN J. REGAN
BY
ATTORNEY

2,822,107

MILK STRAINER COVER

John J. Regan, Utica, N. Y.

Application August 23, 1954, Serial No. 451,486

3 Claims. (Cl. 220—24)

This invention relates to milk strainer covers.

In actual practice, milk is drawn from the cow's udder either by hand or by a mechanical milker and deposited in a pail. During this operation a certain amount of foreign particles or dirt from the animal's body and stable atmosphere enter the milk. To remove this foreign material, it is customary for the milk to be strained or filtered on the farm promptly after milking. Such operations commonly employ a milk strainer, a funnel-shaped utensil which accommodates a strainer or filter pad in the constricted end or bottom thereof. The strainer, with the constricted end thereof disposed downwardly, is positioned within the open mouth of the milk can or intake opening in a storage tank with the tapered sides of the strainer resting on the edge of the opening. In operation, the milk is poured from a pail into the open upper end of the strainer (which is commonly referred to as the strainer bowl) and allowed to flow by gravity through the filter pad positioned in the constricted lower end of the strainer into the milk can or storage tank. However, due to the environmental conditions in and around the areas where the animals are housed and milked, the atmosphere is usually heavily laden with dirt particles. These conditions during warm weather also attract flies and other insects. Thus, the open strainer, if unprotected by proper covering, not only catches dirt particles which settle from the atmosphere, but with the milk passing through the strainer, it also serves as a well baited trap for flies and other insects.

It is accordingly a principal object of the present invention to provide a cover for milk strainers of the above type which will protect the milk from contamination during the process of straining or filtering the milk.

It is another object of the present invention to provide a cover for milk strainers which is adapted to be raised and lowered in an easy and ready manner as the milk pail is raised and lowered during the pouring operation into the milk strainer, effecting thereby an economy of time and labor.

Other objects of the present invention are to provide a milk strainer cover bearing the above objects in mind which is of simple construction, inexpensive to manufacture, has a minimum number of parts, is easy to use and efficient in operation.

For other objects and a better understanding of the invention, reference may be had to the following detailed description taken in connection with the accompanying drawing, in which:

Figure 1 is a top perspective view of a preferred embodiment of the invention shown in operative use on a milk strainer of conventional design;

Fig. 2 is a vertical sectional view thereof taken along the line 2—2 of Fig. 1;

Fig. 3 is a view similar to Fig. 2 but showing the cover in the raised position; and Fig. 4 is a bottom plan view of the invention.

Referring now more in detail to the drawing, 10 represents a milk can or storage tank into which the freshly acquired milk is poured through a funnel-shaped strainer 11 of conventional design and having a restricted neck 12 across which is disposed a filter pad, not shown, all in a manner well known to those skilled in the art.

In the practice of my invention, a cover is provided for the strainer 11 and includes a circular plate 13 of stainless steel or other suitable material adapted to rest on the open upper end of the strainer 11, the diameter of the plate 13 being sufficient to completely cover the strainer top with a slight margin of overlap. A handle is provided for the plate 13 and is formed from an elongated rod of stainless steel or other suitable material having an upper horizontal portion 14 which extends across and is secured to the top of the plate 13 by means of welding 15 or the like (Fig. 2). One end of the horizontal portion 14 of the rod extends slightly beyond the plate 13 and terminates in a downwardly bent portion 16 adapted to engage the side of the strainer 11 whereby to limit the displacement of the plate 13 thereon in one direction, as will be obvious. The other end of the horizontal portion 14 of the rod extends beyond the other side of the plate 13 and is formed with an S-shaped bend 17 which terminates in a second offset horizontal portion 18, substantially as illustrated. A sleeve 19 is slidable along the horizontal portion 18 being limited at one end thereof in its sliding movement by the S-shaped bend 17 and at the other end thereof by means of a loop 19′ formed in the end of the rod. The loop 19′ is sufficiently large to receive therethrough the finger of the user. The collar 19 is formed of stainless steel or other suitable material and is provided for a purpose which will hereinafter become clear. The loop 19′ not only serves to limit the displacement of the sleeve 19 but also provides a practical means for hanging the cover upon a nail or the like when not in use.

An arcuate strip of sheet metal 20 is secured to the undersurface of the plate 13 near the downwardly bent portion 16 by means of welding 21 or the like, the curvature of the strip 20 corresponding to the curvature of the strainer 11 and being adapted to engage the inside thereof whereby to limit the displacement of the plate 13 in the other direction, as will be obvious.

Thus, when the cover is tilted upwardly (Fig. 3) the strip 20 will serve as a stop to prevent the cover from sliding downwardly off the strainer. The curvature of the strip 20 also serves to guide the cover plate 13 back into proper position when lowered from the raised position of Fig. 3.

In operation, when pouring the milk from an ordinary milk pail, not shown, into the strainer 11, it is customary to grasp the handle of the pail in one hand and lift the pail to the required height for pouring. Then, with the other hand, grasping the opposite bottom edge of the pail, the pail is tilted to the pouring position. The design and construction of my cover as described above will enable one to raise and lower the cover automatically with the normal pouring motion of the pail. Thus, as the pail is raised by the hand grasping the handle the sliding collar 19 on the activating rod or handle is grasped by the thumb on the same hand. This is conveniently done as, with the pail handle grasped in the fingers, the thumb of the same hand is free to grasp the sliding collar. With both handle and collar grasped by the same hand, as the pail is raised to proper position and tilted for pouring the collar 19, sliding towards the S-shaped bend 19, automatically tilts the cover plate 13 upward and away from the milk flow. After the pail is emptied, it is withdrawn and lowered by reverse motion and, with both pail handle and sliding collar 19 still grasped in the same hand, the plate 13 is automatically lowered until it again rests in place on the top of the strainer 11 at which point the collar 19 or thumb grasp is released in proper position for the next pouring operation.

It will be apparent to those skilled in the art that the above described principle of activating or raising the cover plate 13 in synchronization with the pouring of the pail might be employed with different structural arrangements or different rear attachment means. For example, such a rear attachment means might be on the frame work separate from the strainer. The invention may also be used in connection with other similar operations where fluids other than milk are poured without departing from the spirit and scope of the invention.

While various changes may be made in the detail construction, it shall be understood that such changes shall be within the spirit and scope of the present invention as defined by the appended claims.

What I claim as new and desire to protect by Letters Patent of the United States is:

1. An article of the class described comprising a cover plate adapted to rest and close the open upper edge of a strainer, means for limiting the displacement of said cover plate in opposite directions on the strainer and handle means for raising and lowering the cover during the pouring operation into the strainer, said handle means including a slidable sleeve adapted to be grasped by the same hand holding the pail handle when pouring into the strainer whereby to raise and lower said handle means and cover plate as the pail is raised and lowered to and from the pouring operations, said handle means comprising a unitary rod having a horizontal portion secured across the top of said cover plate, said horizontal portion extending away from said cover plate and being formed with a substantially S-shaped bend extending downwardly therefrom and terminating in a second horizontal portion offset vertically from said first horizontal portion and extending away from said cover plate, said slidable sleeve being slidable along said second horizontal portion.

2. An article of the class described comprising a cover plate adapted to rest and close the open upper edge of a strainer, means for limiting the displacement of said cover plate in opposite directions on the strainer and handle means for raising and lowering the cover during the pouring operation into the strainer, said handle means including a unitary rod having a horizontal portion secured across the top of said cover plate, said horizontal portion extending away from said cover plate and being formed with a substantially S-shaped bend extending downwardly therefrom and terminating in a second horizontal portion offset vertically from said first horizontal portion and extending away from said cover plate, said slidable sleeve being slidable along said second horizontal portion, said slidable sleeve adapted to be grasped by the same hand holding the pail handle when pouring into the strainer whereby to raise and lower said handle means and cover plate as the pail is raised and lowered to and from the pouring operations, said means for retaining said cover plate against displacement in opposite directions on the strainer comprising said upper horizontal portion extending slightly beyond said cover plate at the end thereof remote from said S-shaped bend and being bent downwardly at substantially right angles thereto whereby to engage the strainer, and an arcuate strip secured to the undersurface of said cover plate adjacent said downwardly bent portion of said rod, said arcuate strip having the same curvature as the inside of the strainer and being adapted to abut therewith when the cover plate is tilted to prevent the same from falling off the strainer.

3. An article of the class described comprising a cover plate adapted to rest and close the open upper edge of a strainer, means for limiting the displacement of said cover plate in opposite directions on the strainer and handle means for raising and lowering the cover during the pouring operation into the strainer, said handle means including a slidable sleeve adapted to be grasped by the same hand holding the pail handle when pouring into the strainer whereby to raise and lower said handle means and cover plate as the pail is raised and lowered to and from the pouring operations, said handle means comprising a unitary rod having a horizontal portion secured across the top of said cover plate, said horizontal portion extending away from said cover plate and being formed with a substantially S-shaped bend extending downwardly therefrom and terminating in a second horizontal portion offset vertically from said first horizontal portion and extending away from said cover plate, said slidable sleeve being slidable along said second horizontal portion, the end of said second horizontal portion of said rod remote from said S-shaped bend being formed with a loop adapted to receive a finger therethrough and to permit the device to be mounted upon a nail when not in use.

References Cited in the file of this patent

UNITED STATES PATENTS

| | | |
|---|---|---|
| 869,746 | Spottswood | Oct. 29, 1907 |
| 1,402,948 | Nelson | Jan. 10, 1922 |

FOREIGN PATENTS

| | | |
|---|---|---|
| 151,127 | Great Britain | Sept. 23, 1920 |